United States Patent
Chang et al.

(10) Patent No.: US 8,979,950 B2
(45) Date of Patent: Mar. 17, 2015

(54) SEALING METHOD FOR BATTERY CONTAINER

(75) Inventors: Tsun-Yu Chang, Taichung (TW); Chun-Chieh Chang, Taichung (TW); Ting-Keng Lin, Taichung (TW)

(73) Assignee: Changs Ascending Enterprise Co., Ltd., Taichung (TW)

( * ) Notice: Subject to any disclaimer, the term of this patent is extended or adjusted under 35 U.S.C. 154(b) by 0 days.

(21) Appl. No.: 13/701,843

(22) PCT Filed: Sep. 16, 2011

(86) PCT No.: PCT/CN2011/079740
§ 371 (c)(1),
(2), (4) Date: Mar. 11, 2013

(87) PCT Pub. No.: WO2013/037125
PCT Pub. Date: Mar. 21, 2013

(65) Prior Publication Data
US 2014/0223729 A1  Aug. 14, 2014

(51) Int. Cl.
*H01M 6/00* (2006.01)
*H01M 2/02* (2006.01)
*H01M 2/04* (2006.01)

(52) U.S. Cl.
CPC .............. *H01M 2/02* (2013.01); *H01M 2/0426* (2013.01); *H01M 2/0439* (2013.01); *H01M 2/0217* (2013.01); *H01M 2220/20* (2013.01)
USPC ..................................................... 29/623.2

(58) Field of Classification Search
CPC ... H01M 2/04; H01M 2/0404; H01M 2/0408; H01M 2/0413; H01M 2/0417; H01M 2/0421; H01M 2/0426; H01M 2/043; H01M 2/0434; H01M 2/0439; H01M 2/0443; H01M 2/0447; H01M 2/0452; H01M 2/0456; H01M 2/046; H01M 2/0465; H01M 2/0469
USPC .......................... 29/623.2; 429/162–167, 176
See application file for complete search history.

(56) References Cited

U.S. PATENT DOCUMENTS

2008/0299451 A1* 12/2008 Funahashi et al. ............ 429/149
2012/0114986 A1*  5/2012 Kim et al. ....................... 429/53

FOREIGN PATENT DOCUMENTS

| CN | 2713650 Y | 7/2005 |
|----|-----------|--------|
| CN | 201117687 Y | 9/2008 |
| CN | 101315972 A | 12/2008 |
| CN | 102005543 A | 4/2011 |
| JP | 2003245970 A | 9/2003 |

* cited by examiner

*Primary Examiner* — Muhammad Siddiquee
(74) *Attorney, Agent, or Firm* — Muncy, Geissler, Olds & Lowe, P.C.

(57) ABSTRACT

A sealing method for battery containers which employs a first fixture to engage with the outer peripheries of edges of an opening of a container made from metal sheets, in order to define a shape of the opening of the container; then a second fixture is inserted into an inner space of the container from its opening, so that the edges of the opening of the container are shaped due to the ductility and malleability properties of metal sheets, and lateral surfaces of the container are made flat; lastly, a cover is placed on the opening of the container to have the container sealed by a welding means. The sealing method can restore an original shape of the container from a deformed state by using the fixtures, so that an entire sealing process for battery containers can be executed by automation in order to save labor costs.

8 Claims, 13 Drawing Sheets

SEALING METHOD FOR BATTERY CONTAINER

BACKGROUND OF THE INVENTION

1. Field of Invention

The present invention relates to a sealing method for battery containers and more particularly to fixtures by which a shape of a container formed from metal sheets can be adjusted automatically, and an original shape of the container can be restored from a deformed state, so that an entire sealing process for battery containers can be executed by automation.

2. Related Art

Because of breakthroughs in materials technology for lithium batteries, secondary batteries have become a power supplies source (e.g. lithium iron phosphate oxide) for devices which require large electricity consumption such as electric bikes and electric wheelchairs. The power storage quantity and power supply quantity of non-aqueous electrolytic secondary lithium batteries are larger than those of conventional lithium battery.

Because of breakthroughs in materials technology for lithium batteries, lithium batteries have become a power supply source (e.g. lithium iron phosphate oxide) for devices which require large electricity consumption such as electric bikes and electric wheelchairs. The power storage quantity and power supply quantity of non-aqueous electrolytic secondary lithium batteries are larger than those of conventional lithium battery. The battery container of the aforementioned secondary lithium battery is usually a metal container made of aluminum. Generally, the metal container is a container made of aluminum or stainless steel with at least one end having an opening; after an anode and a cathode, and a separator are installed in the metal container, the opening of the container is covered by a cover placing on its top, and then the opening of the container and the cover are sealed by using various sealing techniques so as to ensure a long-term and stable sealing of the battery interior to prevent moisture and air from penetrating.

Referring to FIG. 1, typically, a secondary battery 10 contains a plurality of battery cells 50 (three battery cells are shown in the drawing for an example) disposed inside a container 20 (a rectangular battery container is used as an example). Each of the battery cells 50 is composed of an anode layer, a separating layer and a cathode layer which are stacked together, and the battery cells 50 are conductively connected to electrode ends 40 disposed on a cover 30. The container 20 is made of metal sheets including one of stainless steel, nickel-plated steel, aluminum, and aluminum alloy.

Currently, for sealing of the secondary battery 10 (a rectangular battery container is used as an example), longitudinal side edges 21 and transverse side edges 22 of an opening of the container 20 are welded together with longitudinal side edges 31 and transverse side edges 32 of the cover 30 by using a welding device. Typically, a laser welding technique is used for sealing, and the technique uses an intense light source (typically a nitrogen-filled lamp) to actuate a laser resonant cavity of a yttrium iron garnet (YIG bar) to emit a single-frequency light ($\lambda=1.06$ mm), and it is focused into a beam by resonance and refraction, then the focal point is pointed at connecting portions of the longitudinal side edges 21, 31, and the transverse side edges 22, 32 of the container 20 and the cover 30 respectively, so that the corresponding edges are welded together into one body. As a result, an objective for welding and sealing of the cover 30 with the container 20 is achieved.

It should be noted that, in conventional sealing processes of the secondary battery 10, because the container 20 is made of metal sheets, thus the longitudinal side edges 21 and surfaces 23 below the longitudinal side edges 21 can be easily concavely deformed during shipping and handling; furthermore, the transverse side edges 22 and the longitudinal side edges 21 can also be easily deformed and cannot be maintained vertical to each other when a large quantity of the containers 20 are stacked on each other. Manpower has to be relied on during the sealing process of the secondary battery 10 because of the deformation problems of the container 20 mentioned above; therefore, the shapes of the containers 20 have to be adjusted manually before the battery cells 50, which are conductively connected to the electrode ends 40 of the cover 30, can be placed inside the container 20 by workers, and the connecting portions of the longitudinal side edges 21, 31, and the transverse side edges 22, 32 of the container 20 and the cover 30 have to be made flat, before proceeding with sealing by laser welding.

SUMMARY OF THE INVENTION

In order to solve the abovementioned drawbacks, the present invention provides a sealing method for battery containers, by using fixtures, the shape of a container formed from metal sheets can be adjusted automatically, and the original shape of the container can be restored from a deformed state, so that the sealing method is provided for automatically placing battery cells into the container.

Another objective of the present invention is achieved by automatically disposing battery cells into a container and flattening the connecting portions between the edges of the container and the cover, so that the sealing process can be automatically performed by a laser welding in order to save labor costs.

In order to achieve the abovementioned objectives, the present invention discloses a sealing method for battery containers of secondary batteries. A cover is placed on an opening of a container formed from metal sheets, then by using a welding means, the cover and corresponding edges of the container are welded together so as to seal the cover and the container, and the sealing method includes:

Using a first fixture to engage with the outer periphery of edges of an opening of a container to define the shape of the opening of the container; then a second fixture is inserted into an inner space of the container from its opening, and then the second fixture is drawn out from the inner space of the container, so that the shape of the opening of the container is fixed, and the lateral surfaces of the container are made flat due to the ductility and malleability properties of metal sheets; after the cover is placed on the opening of the container, the cover and the container can then be welded together by using a welding means.

In one embodiment, the second fixture comprises a front end portion and a back end portion, a sectional area of the front end portion is smaller than that of the back end portion, and an area of the opening of the container in which the shape of the opening is defined; a maximum sectional area of the back end portion of the second fixture inserted into the inner space of the container is not smaller than the area of the opening of the container in which the shape of the opening is defined.

In one embodiment, the first fixture can be further engaged with the lateral surfaces of the container to fix the shape of the opening of the container and the flatness of the lateral surfaces of the container.

A third fixture can be further used to flatten periphery surface of the cover, so that the periphery surfaces of the cover and the container are on a same plane.

When the cover is placed on the opening of the container, the periphery surface of the cover and the edges of the opening of the container are on a same plane; that is, the dimensions of the opening of the container and the cover are the same, so that a welding means can be performed for sealing by welding onto the top.

In one embodiment, when the cover is placed on the opening of the container, the periphery surface of the cover are located lower than the edges of the opening of the container; that is, the dimension of the cover is slightly smaller than that of an inner circumference of the opening of the container, so that a welding means can be performed for sealing by welding internally.

In one embodiment, when the cover is placed on the opening of the container, a lower circumference of the cover is closely connected to the edges of the opening of the container; that is, the dimension of the cover is the same as that of an outer circumference of the opening of the container, so that a welding means can be performed for sealing by welding laterally.

The advantages of the present invention lie in that: it can be applied to that the battery containers require alignment before welding in a manufacturing process. Due to the ductility and malleability properties of metal sheets, fixtures are used to adjust the shape of the container formed from metal sheets. Therefore, the sealing method of the present invention can be automated to solve the problems of following: the deformation of transverse and longitudinal side edges which are unable to maintain vertical to each other due to stacking and the concavely deformed longitudinal side edges or the lateral surfaces below the longitudinal side edges during shipping and handling. The present technique employs fixtures to automatically adjust the shape of the container formed from metal sheets, and to restore an original shape of the container from a deformed state, so that the battery cells can be automatically placed inside the container, and the connecting portions of the edges of the container and the cover are made flat for sealing by using a laser welding means, therefore an entire sealing process for the battery container can be executed automatically in order to save labor costs.

DETAILED DESCRIPTION OF THE INVENTION

The structure and the technical means adopted by the present invention to achieve the above and other objects can be best understood by referring to the following detailed description of the preferred embodiment and the accompanying drawings, but should not be construed as limitations thereof.

The present invention discloses a sealing method for battery containers and the sealing method can be applied to secondary batteries. A cover is placed on an opening of a container formed from metal sheets. Then, by using a welding means, the cover and corresponding edges of the container are welded together. Sealing of a rectangular battery container is used as an example below, and the method can be applied to any welding techniques which require alignments for processing the battery containers.

Figure 1:
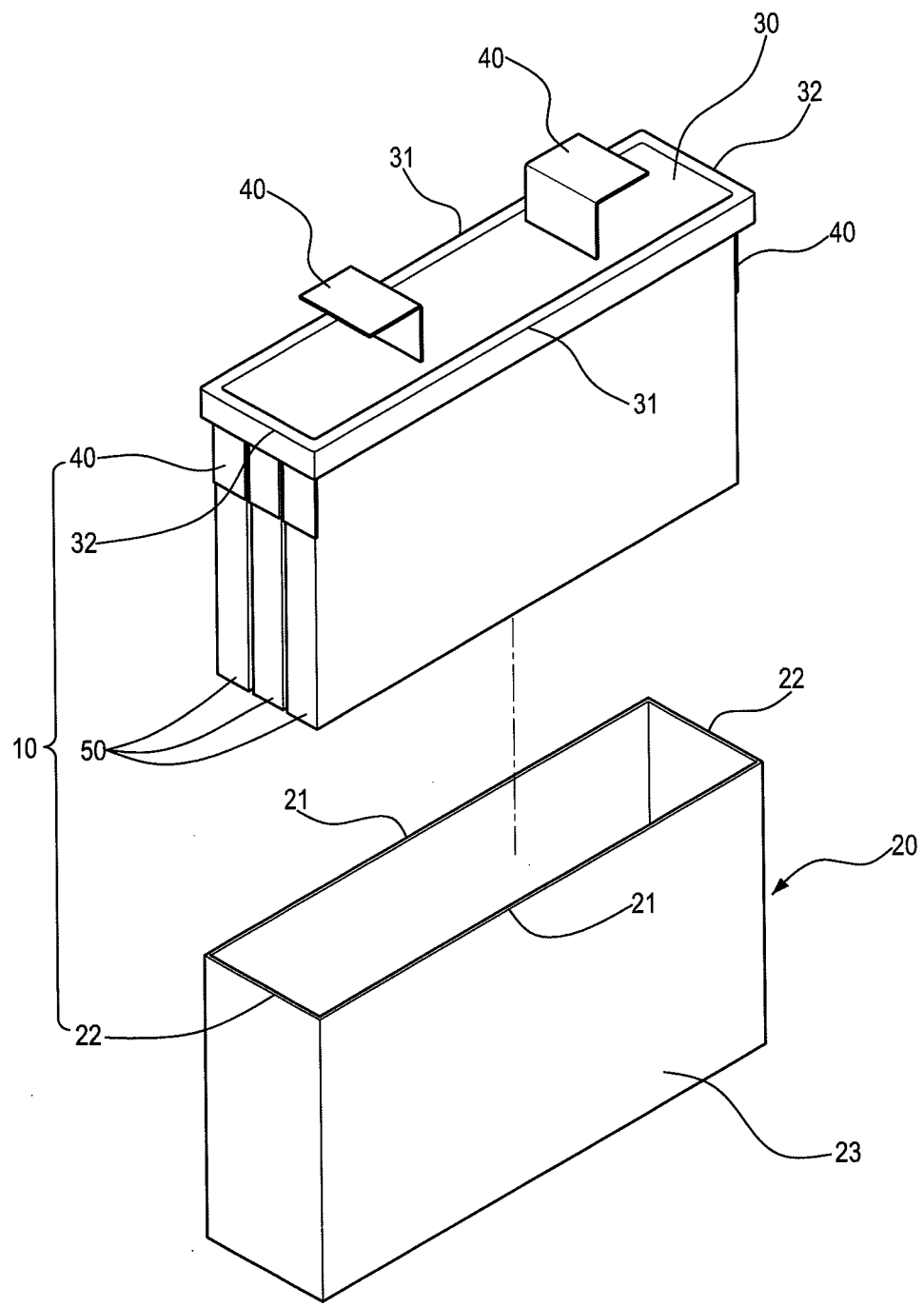
FIG. 1 is an exploded perspective view of a secondary battery.
Figure 2:
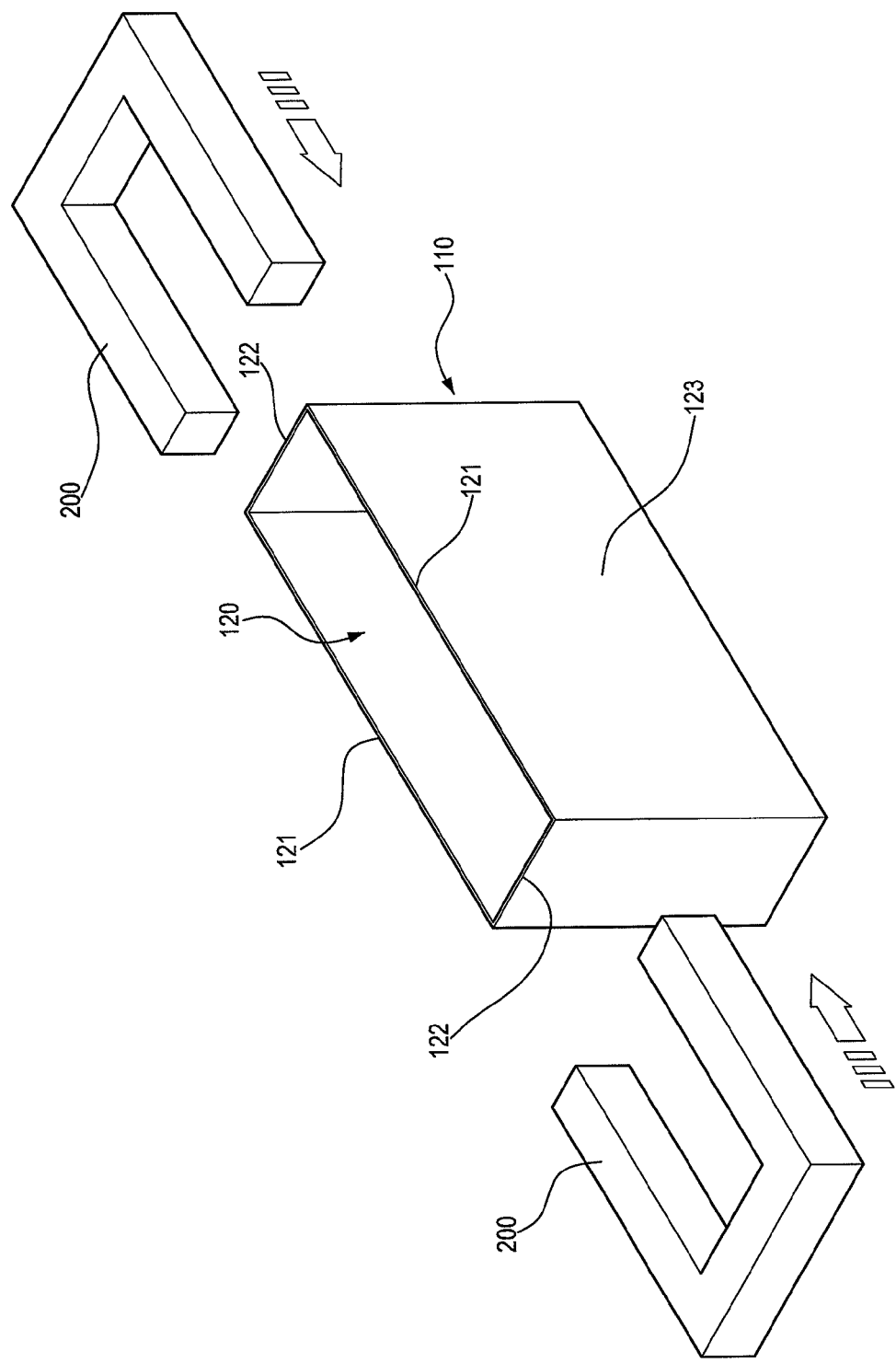
FIG. 2 is an illustration of a first fixture according to one embodiment of the present invention.
Figure 3:
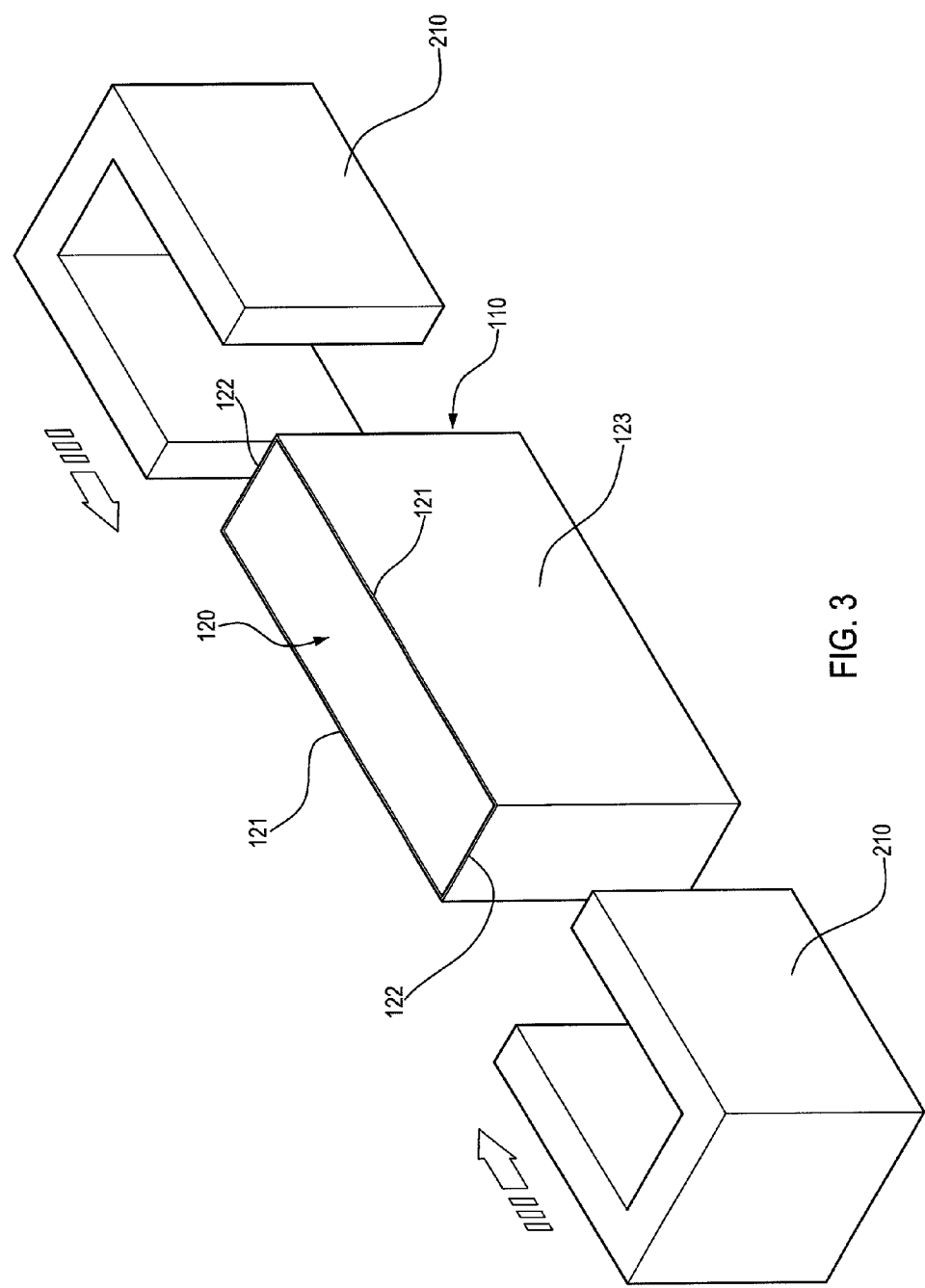
FIG. 3 is an illustration of a first fixture according to another embodiment of the present invention.

Referring to FIGS. 2 to 7, a first fixture 200 is used to engage with the outer periphery of edges of an opening 120 of a container 110; that is, longitudinal side edges 121 and transverse side edges 122 of the opening 120 as shown in FIG. 2, so as to define a shape of the opening 120 of the container 110, to adjust deformation of the longitudinal side edges 121 and the transverse side edges 122 (which are not vertical to each other as shown in FIG. 2) caused by piling up of the containers 110, and also to fix the shape of the opening 120 of the container 110 for subsequent processes. In addition, by using a first fixture 210, an engaging area with the container 110 can be enlarged, and the engaging area may include lateral surfaces 123 of the container 110 as shown in FIG. 3, so that the first fixture 210 can not only fix the shape of the opening 120 of the container 110 but keep the flatness of the lateral surfaces 123.

Figure 4:
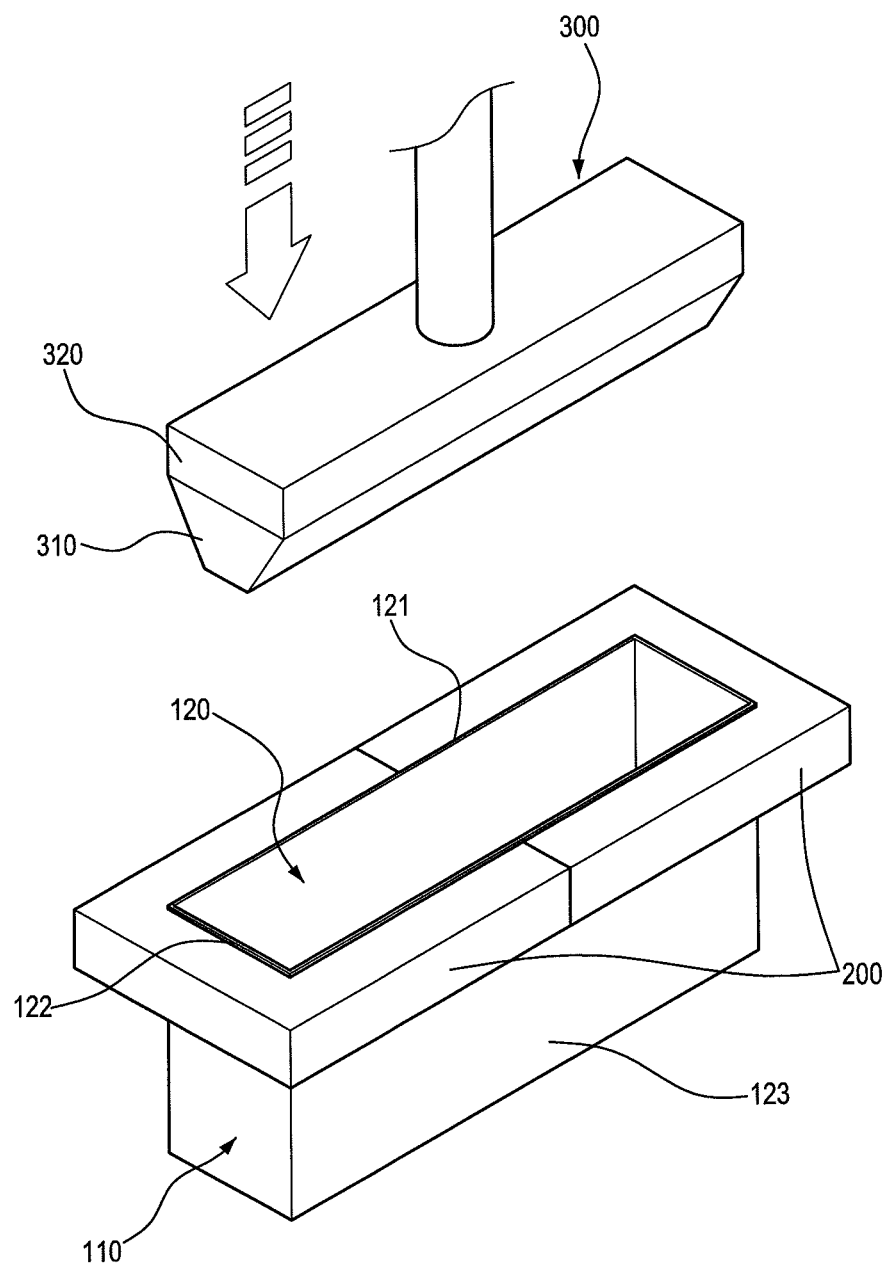
FIG. 4 is a first illustration of a second fixture according to one embodiment of the present invention.
Figure 5:
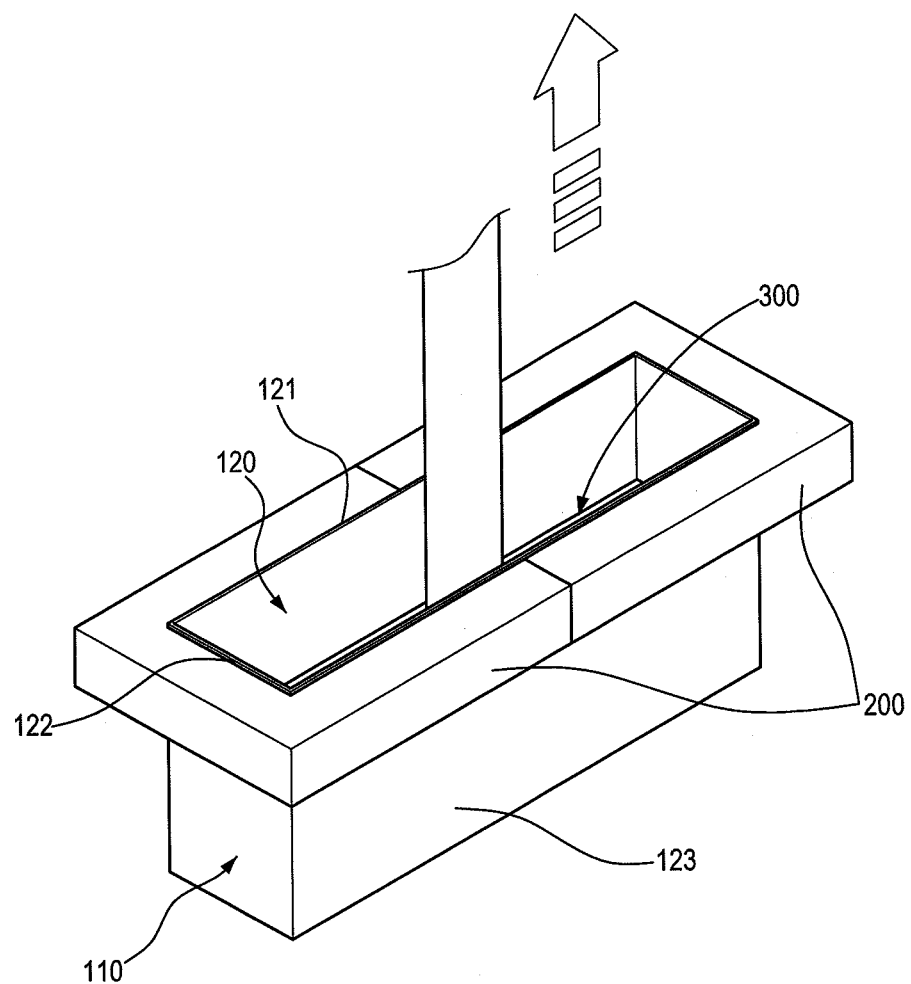
FIG. 5 is a second illustration of a second fixture according to one embodiment of the present invention.

After the first fixture 200 is engaged with the periphery of the opening 120 of the container 110, a second fixture 300 is inserted into an inner space of the container 110 from the opening 120 as shown in FIG. 4, and then the second fixture 300 is drawn out from the inner space of the container 110 as shown in FIG. 5. Due to the ductility and malleability properties of metal sheets, the edges of the opening 120 of the container 110 are shaped (e.g. the transverse side edges 122 and the longitudinal side edges 121 are made vertical to each other), and the lateral surfaces 123 of the container 110 are made flat. The second fixture 300 comprises a front end portion 310 and a back end portion 320. The sectional area of the front end portion 310 is smaller than that of the back end portion 320 and the opening 120 of the container 110, and the sectional area of the back end portion 320 of the second fixture 300 must not be smaller than the area of the opening 120 of the container 110 in which the shape of the opening 120 is defined. It is shown in the figures as an example that the maximum sectional area and the shape of the back end portion 320 are the same as those of a cover 150.

Accordingly, even though the longitudinal side edges 121 and the lateral surfaces 123 below the longitudinal side edges 121 or the opening 120 of the container 110 may be concavely deformed during handling and transportation, an original shape of the container 110 can still be restored from a deformed state by inserting the front end portion 310 of the second fixture 300 into the inner space of the container 110 such that the shape of the container 110 formed from metal sheets can be adjusted by the back end portion 320 of the second fixture 300 due to the ductility and malleability properties of metal sheets.

Figure 6:
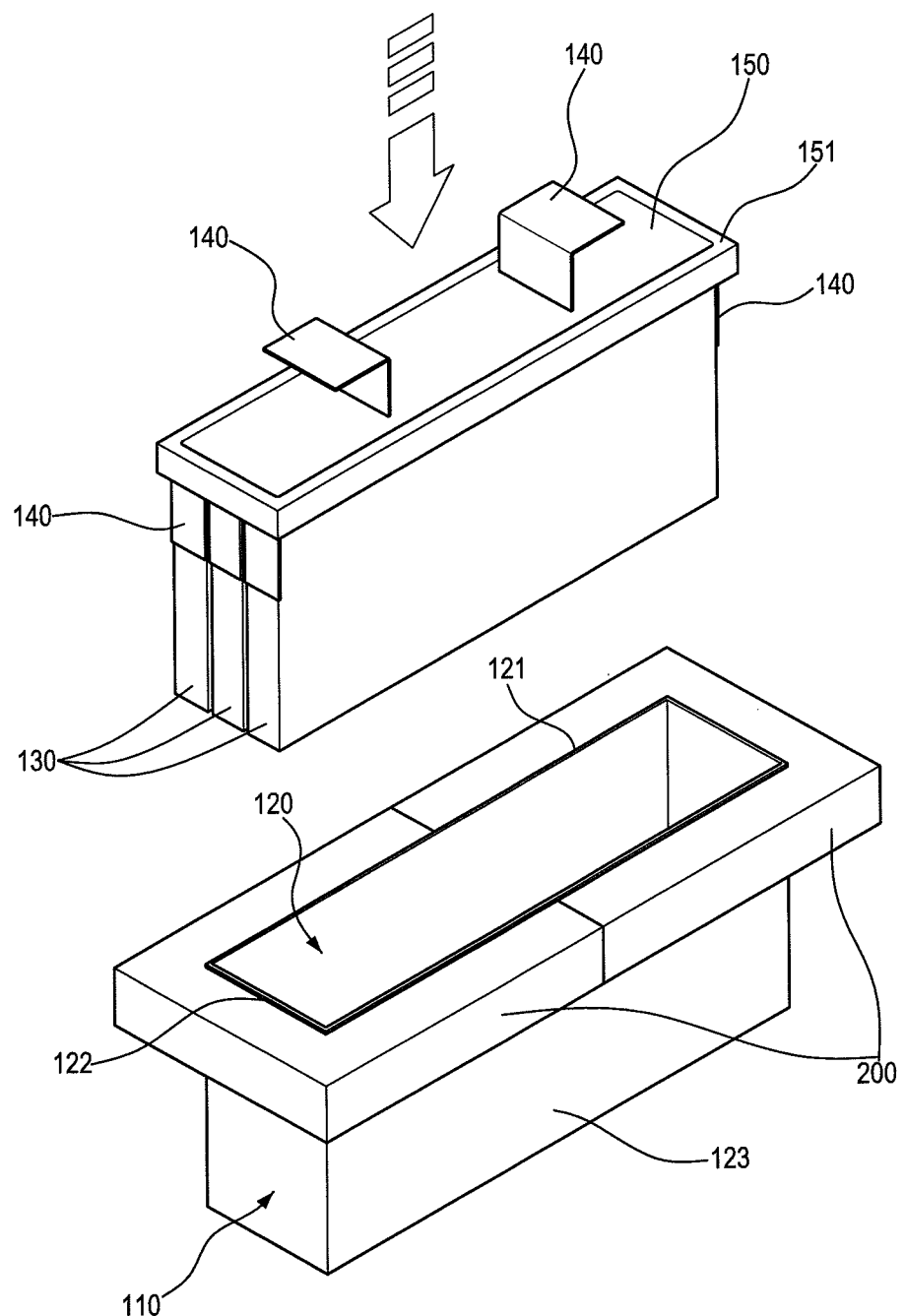
FIG. 6 is an assembling illustration of a cover and a container according to one embodiment of the present invention.

Lastly, the cover 150 which is conductively connected to at least one battery cell 130 (three battery cells 130 are used as an example as shown in the figures) is placed on the opening 120 of the container 110 as shown in FIG. 6. Typically, two electrodes 140 made of metal are penetrated through the cover 150 for electrically connected to an anode and a cathode of the battery cells 130 respectively. Practically, any conventional structures for electric connection of the cover 150 and the battery cells 130 can be applied, that is, any types of electrode which can go through the cover.

Figure 7:
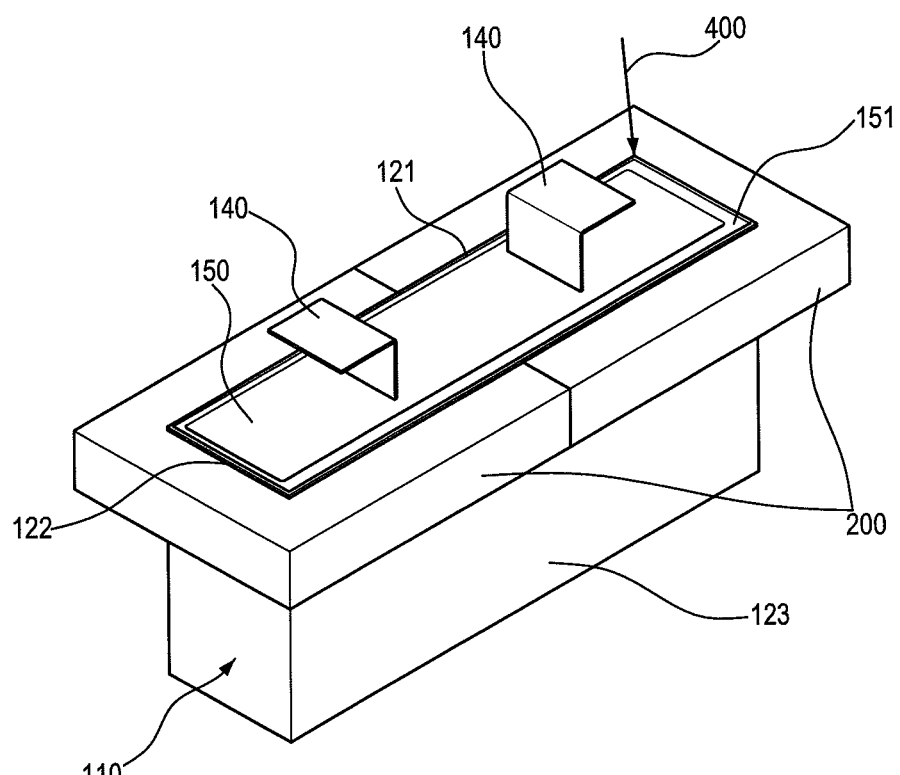
FIG. 7 is a first illustration showing a welding area of a cover and a container according to one embodiment of the present invention.

The battery cells 130 which are conductively connected to the cover 150 are disposed in the inner space of the container 110, and the cover 150 is placed on the opening 120 of the container 110. In addition, since the periphery surface of the cover 150 and the edges of the opening 120 of the container 110 are located at a same plane, a laser 400 is used for welding and sealing the cover 150 with the container 110 by a laser welding means from top as shown in FIG. 7. A metal layer 151 (commonly used metals such as copper, aluminum, etc.) of the cover 150 at the periphery surface thereof and the corresponding edges (the longitudinal side edges 121 and the transverse side edges 122) of the container 110 are welded together so that sealing of the battery container is achieved. The laser welding technique for sealing is of prior arts and is not an emphasis of the present invention; therefore it will not be explained further in details.

Figure 8:
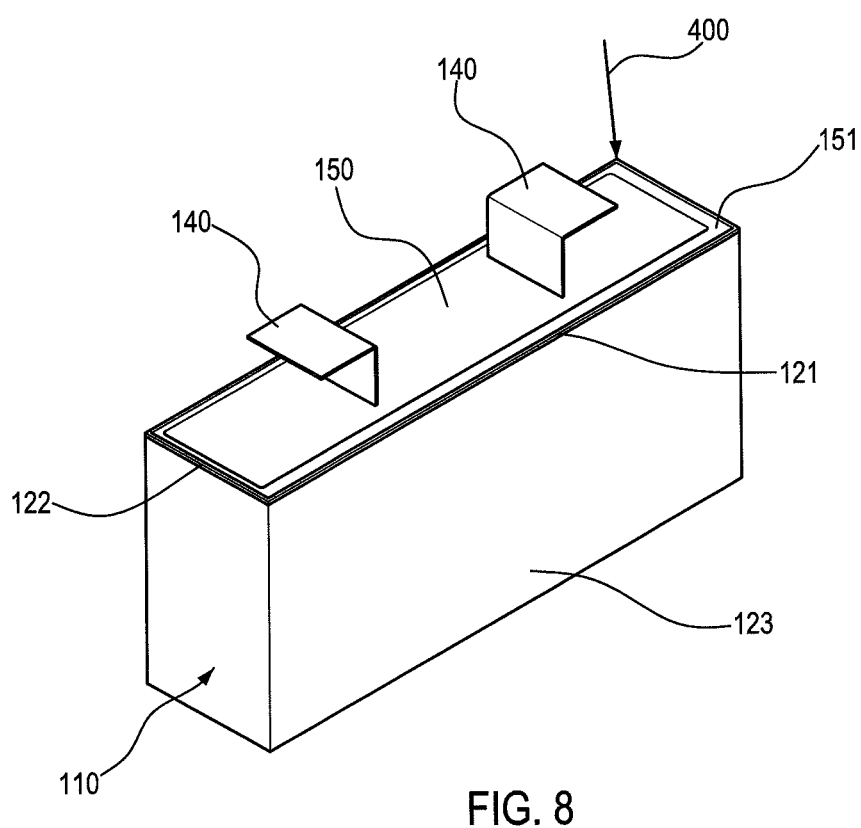
FIG. 8 is a second illustration showing a welding area of a cover and a container according to one embodiment of the present invention.

Referring to FIG. 8, alternatively, after the first fixture 200 is detached from the container 110, the laser 400 is used for welding and sealing. The metal layer 151 of the cover 150 at the periphery surface thereof and the corresponding edges (the longitudinal side edges 121 and the transverse side edges 122) of the container 110 are welded together so that sealing of the battery container is achieved.

Figure 9:
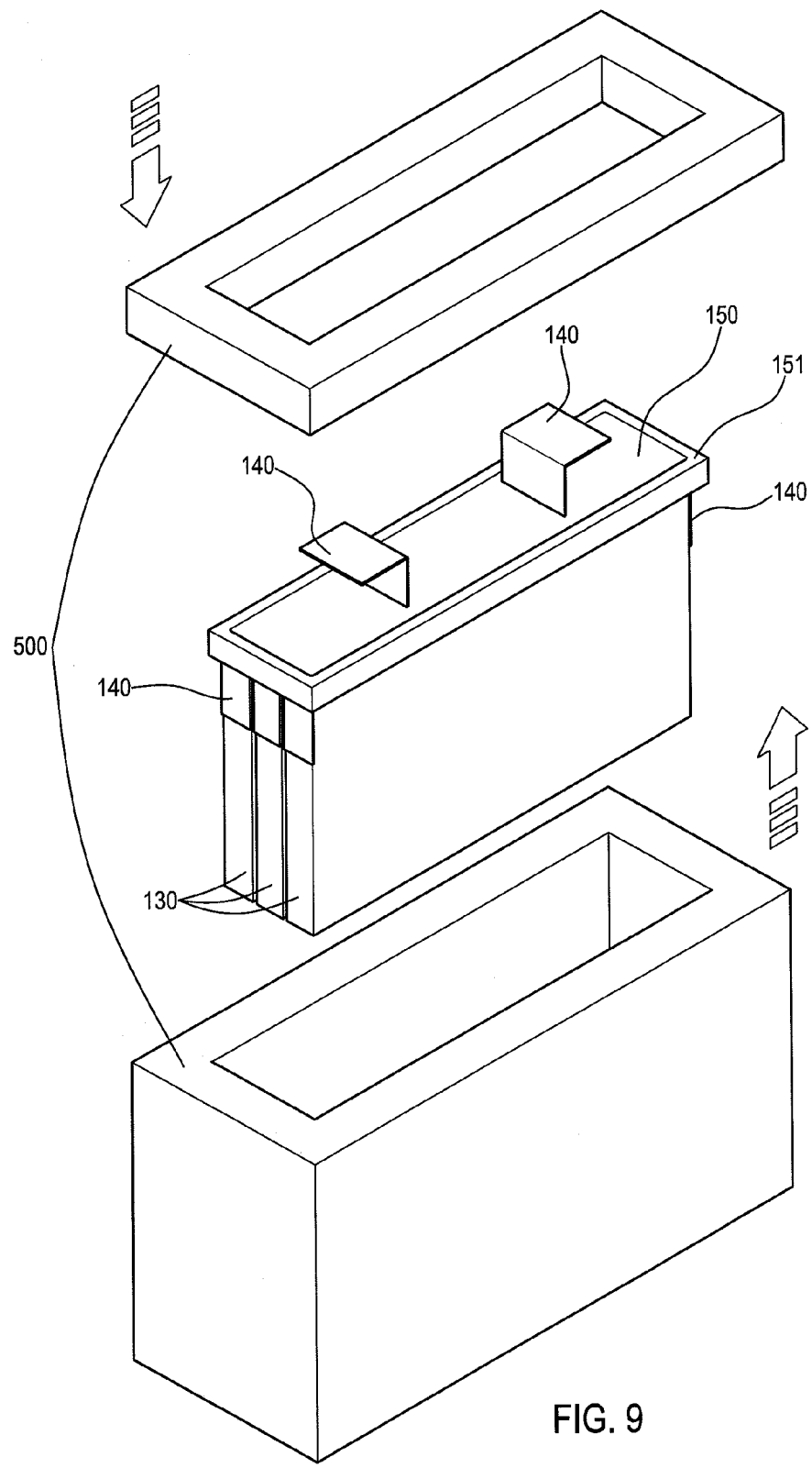
FIG. 9 is an illustration of a cover being flatly pressed according to one embodiment of the present invention.

Referring to FIG. 9, in one embodiment, before the cover 150 is placed on the opening 120 of the container 110, a third fixture 500 can be further used. The periphery surface of the cover 150 may be pressed by the third fixture 500 so as to flatten the periphery surface of cover 150. When the cover 150 is placed on the opening 110 of the container 120, the periphery surface of the cover 150 and the edges (the longitudinal side edges 121 and the transverse side edges 122) of the opening 120 of the container 110 are located at a same plane; therefore it is more convenient to use the laser 400 to perform welding and sealing operations, so that the metal layer 151 of the cover 150 at the periphery surface thereof and the corresponding edges of the container 110 are welded together, and sealing of the battery container is achieved.

Figure 10:
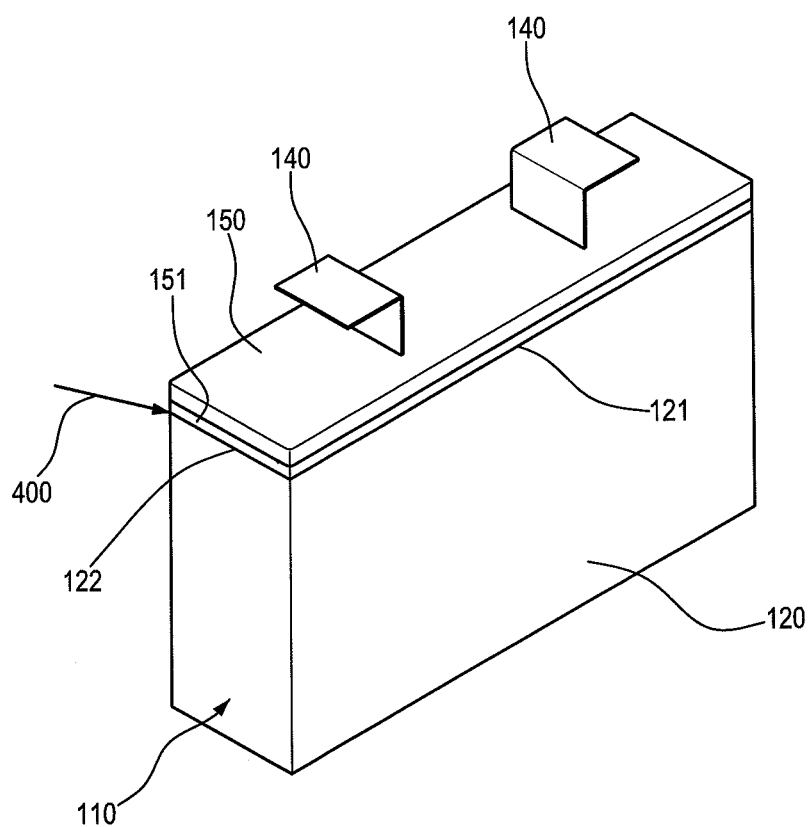
FIG. 10 is a first illustration of a cover and a container being welded together according to one embodiment of the present invention.

Referring to FIG. 10, in one embodiment, when the cover 150 is placed on the opening 120 of the container 110, a lower circumference of the cover 150 is closely connected to the edges (the longitudinal side edges 121 and the transverse side edges 122) of the opening 120 of the container 110; that is, the dimension of the cover 150 is the same as that of the opening 120 of the container 110, then the laser 400 is used to weld the metal layer 151 of the cover 150 at the lateral sides thereof with the corresponding edges of the container 110 together from lateral sides, and sealing of the battery container is achieved.

A rectangular battery container is used as an example in the invention. However, it is not limited thereto, and the opening of the container does not have to be rectangular; if the first fixture is an oval shape (to correspond with a design of the cover), or a rectangular shape with beveled edges, the second fixture can also be designed to match the cover and the first fixture, so that the shape of the opening of the cover can be changed.

Figure 11:
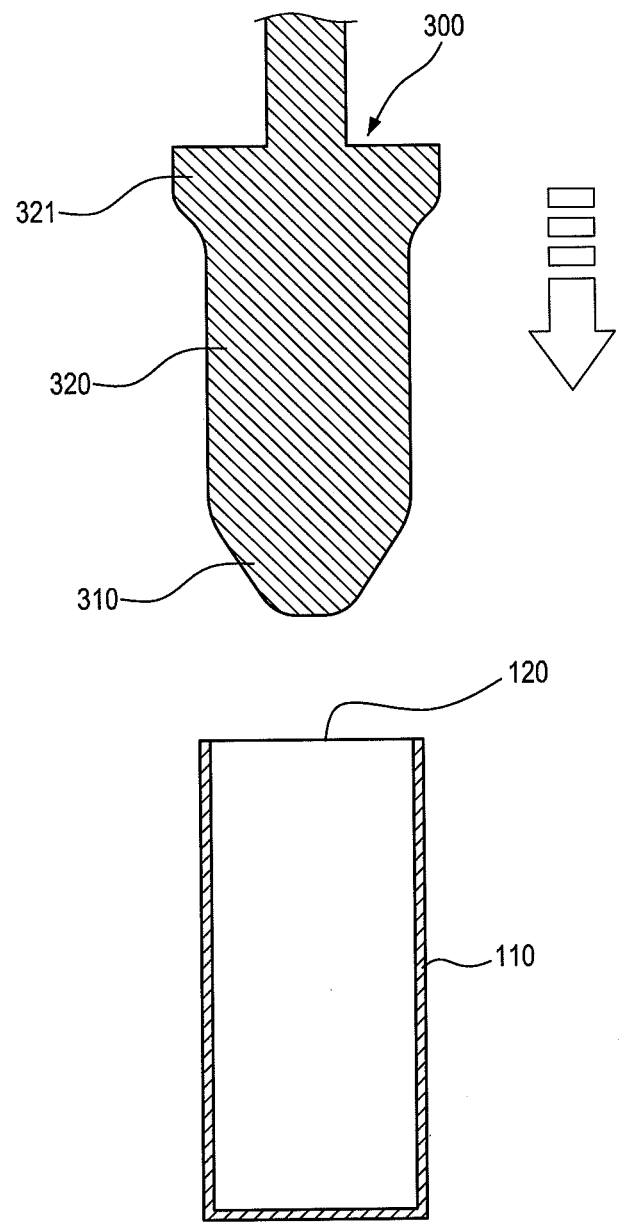
FIG. 11 is a first sectional view of a second fixture according to one embodiment of the present invention.
Figure 12:
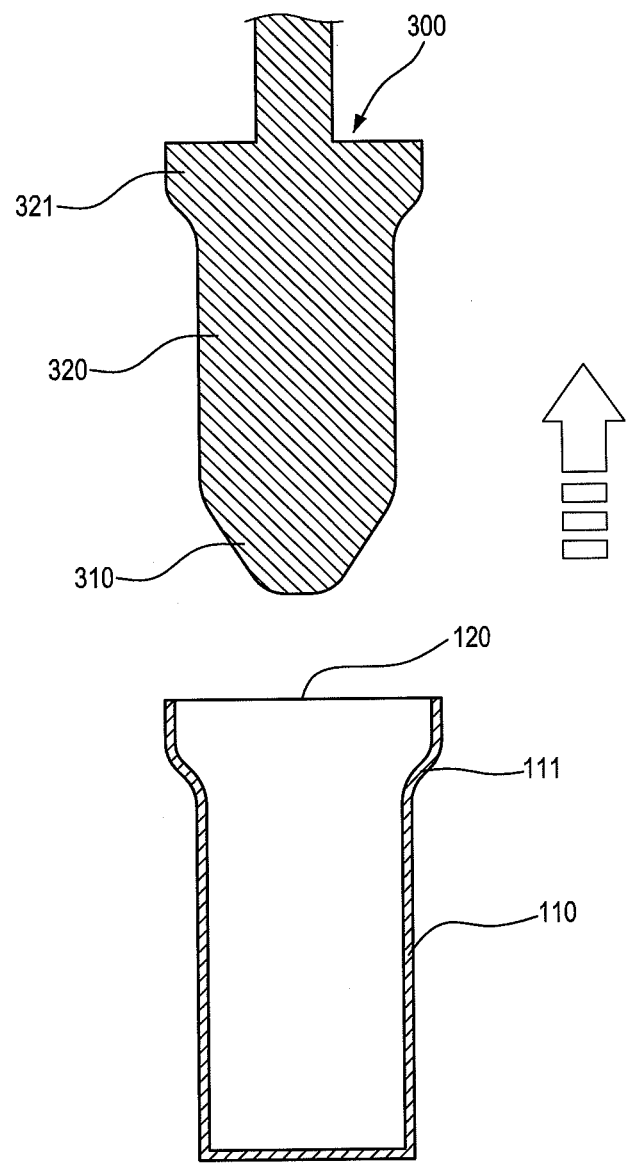
FIG. 12 is a second sectional view of a second fixture according to one embodiment of the present invention.
Figure 13:
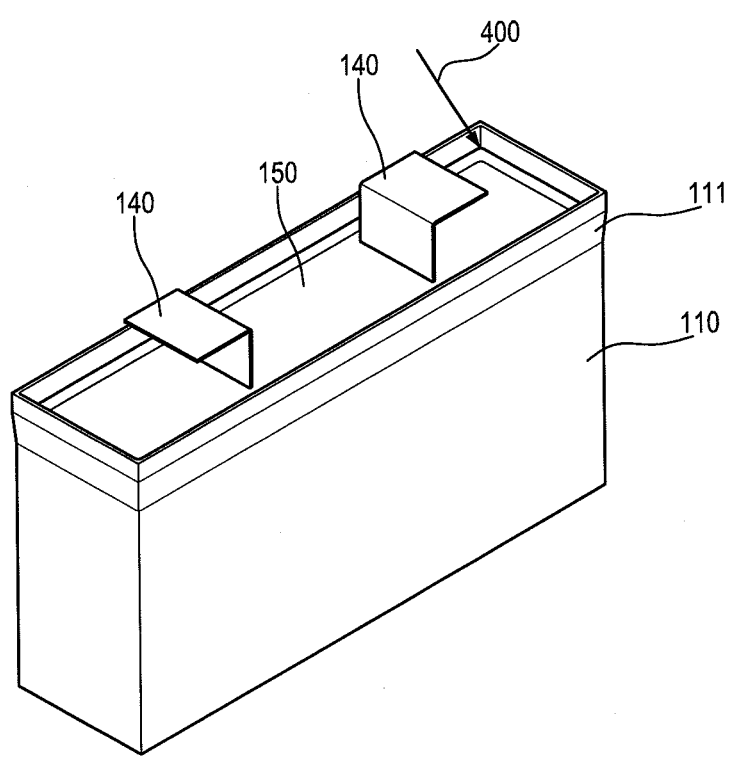
FIG. 13 is a second illustration of a cover and a container being welded together according to one embodiment of the present invention.

Referring to FIGS. 11 to 13, a pressing portion 321 can be formed on the back end portion 320 of the second fixture 300. In one embodiment, a sectional area of the pressing portion 321 can be slightly larger than the area of the opening 120 of the container 110 as shown in FIG. 11, so that after the second fixture 320 is disposed in the inner space of the container 110 from the opening 120 and a notch 111 is formed near the opening 120 of the container 110 as shown in FIG. 12; this is an advantage for positioning of the cover 150 on the opening 120 of the container 110, for example, tightly contact between the cover 150 and the container 110 can be confirmed by slightly pressing on the cover 150. In the embodiment, the cover 150 is placed on the opening 120 of the container 110, and the periphery surface of the cover 150 are located lower than the edges (the longitudinal side edges 121 and the transverse side edges 122) of the opening 120 of the container 110; that is, the cover 150 is slightly smaller than the dimensions of an inner circumference of the opening 120 of the container 110, then the laser 400 is used to weld the metal layer 151 of the cover 150 at the periphery surface thereof with the corresponding edges of the container 110 together by welding internally, and sealing of the battery container is achieved.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A sealing method for battery containers, applied to secondary batteries and a cover is placed on an opening of a container formed from metal sheets, then by using a welding means, the cover and corresponding edges of the container are welded together, the method including:
   using a first fixture to engage with outer periphery of edges of the opening of the container to define a shape of the opening of the container;
   inserting a second fixture into an inner space of the container from the opening, and then drawing the second fixture out from the inner space of the container, so that the shape of the opening of the container is fixed, and lateral surfaces of the container are made flat;
   placing the cover on the opening of the container, and performing the welding means to weld the cover with the container together.

2. The sealing method for battery containers as claimed in claim 1, wherein the second fixture comprises a front end portion and a back end portion, a sectional area of the front end portion is smaller than a sectional area of the back end portion and an area of the opening of the container in which the shape of the opening is defined.

3. The sealing method for battery containers as claimed in claim 2, wherein a maximum sectional area of the back end portion of the second fixture inserted into the inner space of the container is not smaller than the area of the opening of the container in which the shape of the opening is defined.

4. The sealing method for battery containers as claimed in claim 1, wherein the first fixture is further engaged with the lateral surfaces of the container to fix the shape of the opening of the container, and flatness of the lateral surfaces of the container.

5. The sealing method for battery containers as claimed in claim 1, wherein before the cover is placed on the opening of the container, a third fixture is further used to flatten periphery surfaces of the cover, so that all the periphery surface of the cover are on a same plane.

6. The sealing method for battery containers as claimed in claim 1, wherein when the cover is placed on the opening of the container, the periphery surface of the cover and the edges of the opening of the container are located at a same plane.

7. The sealing method for battery containers as claimed in claim 1, wherein when the cover is placed on the opening of the container, the periphery surface of the cover are located lower than the edges of the opening of the container.

8. The sealing method for battery containers as claimed in claim 1, wherein when the cover is placed on the opening of the container, a lower circumference of the cover is closely connected to the edges of the opening of the container.

\* \* \* \* \*